UNITED STATES PATENT OFFICE.

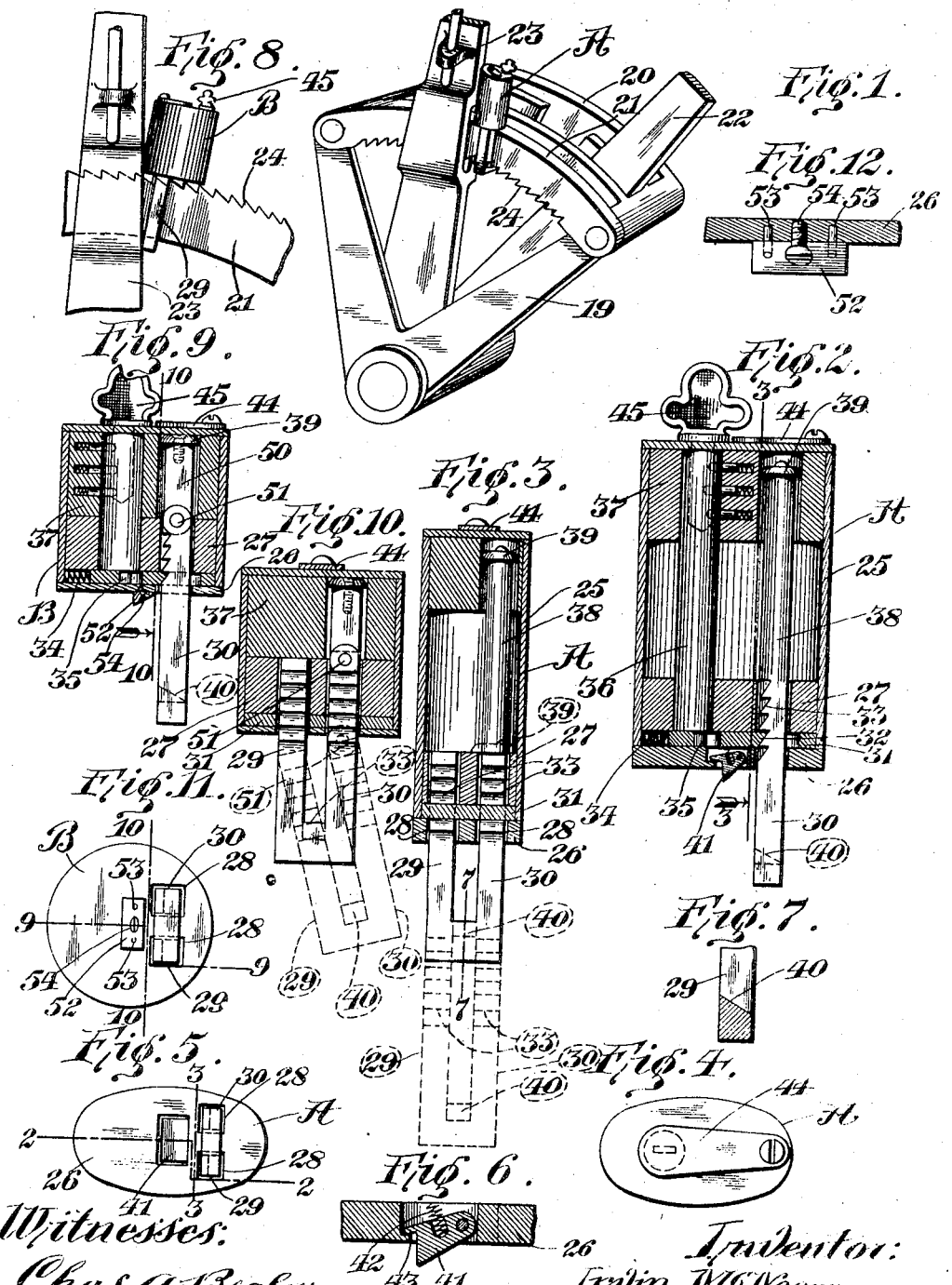

IRVIN McNEECE, OF ST. LOUIS, MISSOURI.

AUTOMOBILE-LOCK.

1,134,054.  Specification of Letters Patent.  Patented Mar. 30, 1915.

Application filed December 9, 1911. Serial No. 664,862.

*To all whom it may concern:*

Be it known that I, IRVIN McNEECE, a citizen of the United States, and residing at St. Louis, in the State of Missouri, have invented certain new and useful Improvements in Automobile-Locks, of which the following is a specification.

This invention relates to locking devices and particularly to locking devices for automobiles to prevent unauthorized operation thereof.

It is often desirable to lock an automobile so as to prevent unauthorized persons from operating or tampering with the same. Such a lock should control the brake mechanism so as to lock the brake lever in position with the brake applied, for if the speed controlling lever is only locked, the automobile can be moved to a place where the lock can be broken and removed. If however the automobile is locked by locking the brake in braked position, then it cannot be moved even though the engine and the speed controlling lever or clutch are left free to be operated.

Another advantage resulting from the application of the locking device to the brake mechanism, particularly to the brake segment, is due to the fact that brake segments are substantially of uniform shape although of different sizes, whereas the segments, slots, guides, etc. for speed controlling levers are varied. Moreover, brake segments vary in depth rather than thickness, since the segments of different automobiles do not vary more than one-sixteenth of an inch. This peculiar uniform feature of brake segments enables a locking device to be constructed which will fit substantially all sizes and makes of automobiles.

One of the objects of this invention therefore is to construct a locking device which is arranged to be used with and placed on all sizes and makes of automobiles, and is arranged to adjust itself automatically to locked members of different sizes.

Another object is to construct a locking device which is adapted to positively embrace and engage the locked member, so that the fit will be close enough to prevent it from working loose, and for this purpose it is preferably constructed to engage the notches universally formed in brake lever segments.

Another object is to produce a locking device which will be simple in construction, cheap to manufacture, easy to manipulate, and of light weight and small size; and further objects will appear from the detail description taken in connection with the accompanying drawings in which:

Figure 1 is a perspective view showing an automobile brake segment and lever and showing the locking device forming the subject matter of this invention applied thereto, Fig. 2 is a section on the line 2—2 Fig. 5, Fig. 3 is a section on the line 3—3 Fig. 2, Fig. 4 is a top view of Fig. 2, Fig. 5 is a bottom view of Fig. 2, Fig. 6 is a detail enlarged section of a part of Fig. 2, Fig. 7 is a detail enlarged section on the line 7—7 Fig. 3, Fig. 8 is a view showing another form of this invention applied to a brake segment having teeth or notches at the top instead of at the bottom, Fig. 9 is a section on the line 9—9 Fig. 11, Fig. 10 is a section on the line 10—10 Fig. 9, Fig. 11 is a bottom view of Fig. 9, and Fig. 12 is a detail section of Fig. 9.

Referring to the accompanying drawing and more particularly to Figs. 1 to 7 inclusive, 19 designates a bracket supporting the usual H slot guide 20 and the brake segment or rack bar 21. A speed controlling lever is shown at 22 and a brake lever at 23. The segment 21 is notched or toothed as shown at 24. The locking device forming the subject matter of this invention is shown at A Fig. 1 and comprises a lock casing having a stirrup adapted to be slipped over the brake segment and embrace and engage the same.

The locking device comprises a casing 25 having an end 26 and a cross member 27 spaced from the end. The end and cross member are provided with square holes 28 adapted to receive the legs 29 and 30 of a stirrup.

A locking plate 31 is located and guided between the end 26 and the member 27 and is provided with beveled teeth 32 adapted to engage beveled teeth 33 on the legs 29 and 30. The plate 31 is moved into locking engagement with the stirrup by means of a spring 34, and is moved out of locking engagement by means of a pin 35 on the cylinder 36 of a lock 37 engaging a slot in the plate 31. The leg 29 and the lower part of the leg 30 are square in cross section, but the upper part of the leg 30 is round as shown at 38 so that when the stirrup is dropped down as shown in dotted lines Fig. 3 the stirrup can be turned in the casing.

A plate 39 screwed to the top of the leg 30 limits the outward movement of the stirrup. The yoke of the stirrup has formed thereon a beveled tooth 40 adapted to engage the teeth on the brake segment. The end or base 26 of the casing 25 is also provided with a similarly shaped tooth, but this tooth 41 is movable into and out of operative position. This tooth is pivoted in a recess in the end 26 and is normally moved outwardly by a spring 42, the outward movement being limited by coöperating stops 43 on the tooth and casing end respectively.

A keyhole guard 44 is provided for covering the keyhole when the key 45 is removed so as to prevent water from entering.

Fig. 1 shows the device applied to a brake segment. To apply the device the key 45 is manipulated to withdraw the locking plate from engagement with the legs of the stirrup. The stirrup is then moved to dotted position Fig. 3. The device can now be slipped over the brake segment in front of the brake lever after this brake lever has been moved to braking position. The stirrup and casing can now be telescoped until the brake segment is embraced and engaged by the stirrup and the casing. As the stirrup is moved into the casing the teeth on the legs will snap over the teeth 32 on the locking plate, and this locking plate will therefore firmly hold the stirrup in adjusted engaged position. When the locking device is in position, the tooth 40 will engage one of the notches 24 on the brake segment, and the device will therefore be held positively in position so as to positively retain the brake lever against movement. In case the notches 24 are on the upper face of the brake segment, the tooth 41 will come into play to engage the notches, but if the upper face of the segment is smooth, the tooth 41 will move to inoperative position so as not to mar the segment. It will be noted that the stirrup is locked in all positions of adjustment, whereby the locking device is arranged to embrace and engage brake segments of different sizes. The legs of the stirrup are uniformly spaced to form a narrow space therebetween. This construction permits the device to firmly and closely embrace and engage a lever segment.

Sometimes a brake lever is moved forwardly to braking position. The notches or teeth will therefore be reversely positioned on the brake segment. This device is however so constructed that it can engage and embrace segments and the teeth thereon irrespective of the position of the teeth. To apply the device to a segment in which the teeth are arranged reversely from that shown in Fig. 1, the stirrup is moved to dotted position Fig. 3, and this stirrup is then slipped on the brake segment from the inside or through the space between the brake segment and the adjacent bar of the H slot. This requires that the stirrup and casing turn one on the other for which purpose the upper end 38 of the leg 30 is rounded as shown.

Figs. 8 to 12 inclusive show another form of this invention. The locking device B is in this case provided with a stirrup in which one leg 30 is provided with a section 50 jointed thereto at 51. The construction and operation will be obvious from the drawing Figs. 9 and 10. When the stirrup is moved to dotted position Fig. 10 the joint 51 will be outside of the casing so that the stirrup can be swung with respect to the casing for the purpose of applying the device to a brake segment. The construction is otherwise practically the same as that shown in Figs. 1 to 7 inclusive. This construction results in a shortening of the device as a whole, enabling the whole device to be made smaller and more condensed. This condensed construction is further brought about by placing the pins in the lock at the left instead of at the right side of the cylinder 36, thereby enabling the stirrup to be brought closer to the cylinder.

It is not necessary to provide the casing with a tooth, but this tooth may be omitted where the device is to be used with segment having teeth at its lower edge. Figs. 9 to 12 inclusive show a tooth which is removably attached to the casing, but is when attached rigidly connected thereto. The tooth generally designated by 52 is provided with dowel pins 53 fitting holes in the casing end to properly locate the tooth 52 in position. This tooth is rigidly secured in position by means of a screw 54 passing through the tooth and into a tapped hole in the casing. With this construction the tooth 52 may be applied or removed at pleasure, and also reversed with respect to the stirrup. When the device is to be used with an automobile having the upper segment edge toothed, the tooth 52 will be applied, but when the segment has teeth at its lower edge, the tooth 52 can be removed so that the upper smooth edge of the segment will not be marred. This device is also therefore constructed to fit any size or type of segment.

As pointed out heretofore, brake segments for different automobiles vary only slightly in thickness. The legs 29 and 30 are therefore spaced apart such a distance as to closely embrace a segment of maximum thickness. This is found in practice to be about a quarter of an inch. After the stirrup is slipped on a segment and locked in position thereon, the lateral movement or play, even on the smallest segment, will be very slight. This is of great advantage for the following reason: The teeth 33 on the stirrup must be fairly coarse so as to possess sufficient strength in order that the segment teeth may not be stripped and the lock opened by inserting a tool between the lock casing and the brake segment. In view of the fact, therefore, that these teeth must necessarily be coarse, there will necessarily be considerable vertical play of the lock on the segment. If, therefore, there is also considerable lateral play, it is possible to swing the entire lock on the segment, thereby permitting it to be moved along the segment, so as to release the brake lever. In accordance with this invention, the stirrup is not only constructed so as to closely embrace the lever segment, thereby limiting the lateral play, but the construction and arrangement of the stirrup with respect to the casing is such that the stirrup may be slipped on a segment of substantially the same thickness as the space between the legs. Thus, in the construction shown in Figs. 1 to 7 inclusive, the stirrup can be moved out of the casing until the distance between the end of the short leg 29 and the bottom of the casing is equal to the depth of the largest brake segment, so that the stirrup can be slipped on by a lateral movement. It is therefore not necessary to space the legs apart a distance equal to the thickness of the greatest segment plus the distance between the face of the leg and the outside lateral face of the casing as in prior constructions. Similarly, in the construction shown in Figs. 8 to 11 inclusive, the stirrup can also be slipped on a brake segment of a thickness equal to the space between the stirrup legs, after the stirrup is moved out of the casing. With these constructions, therefore, after the lock is not in position on the segment, it cannot be swung or otherwise moved to such a position as to loosen the grip of the device on the segment.

It will thus be seen that this invention accomplishes its objects. A device is constructed which is arranged to be used with a variety of brake segments having teeth either at the top or at the bottom or in any direction. The device is further arranged to adapt and adjust itself to brake segments of different sizes. Since the brake segment is engaged by a member engaging the teeth thereon, the device will be positively maintained in position to positively prevent movement of the brake bar. Not only may this device be placed on a brake segment, but also on a pedal or lever for controlling the brake or any other suitable mechanism.

It is obvious that various changes may be made in the details of construction without departing from this invention, and it is therefore to be understood that this invention is not to be limited to the specific construction shown and described.

Having thus described the invention what is claimed is:

1. A locking device for a lever having a notched segment, comprising a lock casing and a stirrup telescoping with said casing, said stirrup being arranged with respect to said casing and having its legs closely spaced, to laterally engage and embrace the segment and prevent lateral tipping movement thereon, and said stirrup and casing being adapted to closely hold the segment therebetween, a tooth on one of said first two members adapted to engage the teeth on the segment when the device is in position thereon, said parts being adjustable to segments of different depths, and means for interlocking said members in engaged position on the segment.

2. A locking device of the class described, comprising a lock casing, a stirrup mounted in said casing and movable therein to different positions, and a notch engaging tooth mounted on one of said members and movable to operative and inoperative positions.

3. A locking device of the class described comprising a lock casing, a stirrup mounted in said casing and movable therein to different positions and a reversible tooth mounted on one of said members.

In testimony whereof I affix my signature in presence of two witnesses.

IRVIN McNEECE.

Witnesses:
J. H. BRUNINGA,
MARIE E. PAUCK.